Dec. 12, 1961 H. BLEAM 3,013,259

ELECTRIC PULSE ENCODING DEVICE

Filed June 11, 1956 3 Sheets-Sheet 1

INVENTOR.
HOWARD BLEAM

BY Lippincott & Smith

ATTORNEYS

INVENTOR.
HOWARD BLEAM
BY Lippincott & Smith
ATTORNEYS

ELECTRIC PULSE ENCODING DEVICE

Filed June 11, 1956

INVENTOR.
HOWARD BLEAM
BY Lippincott & Smith
ATTORNEYS

United States Patent Office 3,013,259
Patented Dec. 12, 1961

3,013,259

ELECTRIC PULSE ENCODING DEVICE

Howard Bleam, Park Ridge, Ill., assignor to Admiral Corporation, Chicago, Ill., a corporation of Delaware
Filed June 11, 1956, Ser. No. 590,464
6 Claims. (Cl. 340—354)

This invention relates to apparatus for producing a plurality of similar electric pulses in timed sequence, and in particular to an improved encoding device for providing repetitive coded sequences of electric pulses.

In an air traffic control beacon system, an encoding device is required to provide a repetitive coded sequence of electric pulses in precisely and accurately timed relation. Each sequence contains a maximum of eight substantially identical electric pulses spaced at intervals of 2.9 microseconds. The first and last pulses of each sequence are always present, but any combination of the remaining six pulses may be provided to represent information that is to be transmitted. Encoding devices heretofore used for this purpose have been complex, bulky and expensive. Accordingly, an object of this invention is to provide an improved encoding device, of simple and economical construction, for supplying the required coded sequences of electric pulses.

An electrical delay line having a plurality of pick-up circuits coupled to successive points along its length is generally employed to establish the relative time positions of the electric pulses in each sequence. Input pulses are supplied repetitively to the delay line, and as each input pulse travels down the delay line a plurality of signals are produced in the pick-up circuits for controlling the time relations of output pulses provided by the encoding device.

Because of inherent losses present in any practical delay line, the input pulses decrease in amplitude and increase in width as the pulses travel down the delay line. Consequently, if all of the pick-up circuits were identical, the electric signals provided by successive ones of the pick-up circuits would have progressively decreasing amplitudes and increasing rise times. This is disadvantageous in that any variations in the amplitude of the input pulses produce variations in the time relations of the output pulses of the encoding device. Accordingly, another object of this invention is to equalize the amplitudes and rise times of the signals in the pick-up circuits so that the time relations of the output pulses remain precisely and accurately constant despite variations in the amplitude of the input pulses.

Other objects and advantages of the invention will appear as the description proceeds.

Briefly stated, in accordance with certain aspects of this invention, an improved encoding device includes a distributed-constant electrical delay line and a plurality of movable pick-up coils adjustably spaced along the length of the delay line and inductively coupled thereto. A pulse generator, or the like, supplies repetitive input electric pulses to the delay line, one input pulse for each sequence of output pulses that is desired. As each input pulse travels along the delay line, it induces an electric signal in each of the pick-up coils in sequence, thereby providing a plurality of electric signals in accurately timed sequence.

Selective ones of these induced signals trigger a pulse-forming circuit, such as a blocking oscillator, to provide a coded sequence of substantially identical output electric pulses. Biasing and switching means hereinafter described are provided for selecting the pick-up coils that are to transmit triggering signals to the blocking oscillator, so that the sequence of output pulses can be coded to represent information that is to be transmitted. The time positions of the output pulses in each sequence relative to one another can be adjusted precisely and accurately by adjusting the positions along the delay line of respective ones of the pick-up coils.

In accordance with certain other aspects of this invention, the number of turns in each pick-up coil increases progressively along the length of the delay line. Furthermore, a plurality of loading resistors are connected across respective ones of the pick-up coils, and the resistance of each loading resistor increases progressively along the length of the delay line. The turns numbers of the pick-up coils and the resistances of the loading resistors are so related that the triggering signals provided by the pick-up coils have substantially equal amplitudes and rise times. Consequently, triggering of the blocking oscillator occurs at the same point on the wave form of successive triggering signals, and the time relations of the output pulses supplied by the blocking oscillator remain precisely and accurately constant despite variations in amplitude of the input pulses supplied to the delay line.

The invention will be better understood from the following detailed description taken in connection with the accompanying drawings, and its scope will be pointed out in the appended claims. In the drawings, FIG. 1 is a schematic circuit diagram of apparatus embodying principles of this invention;

Figure 1:
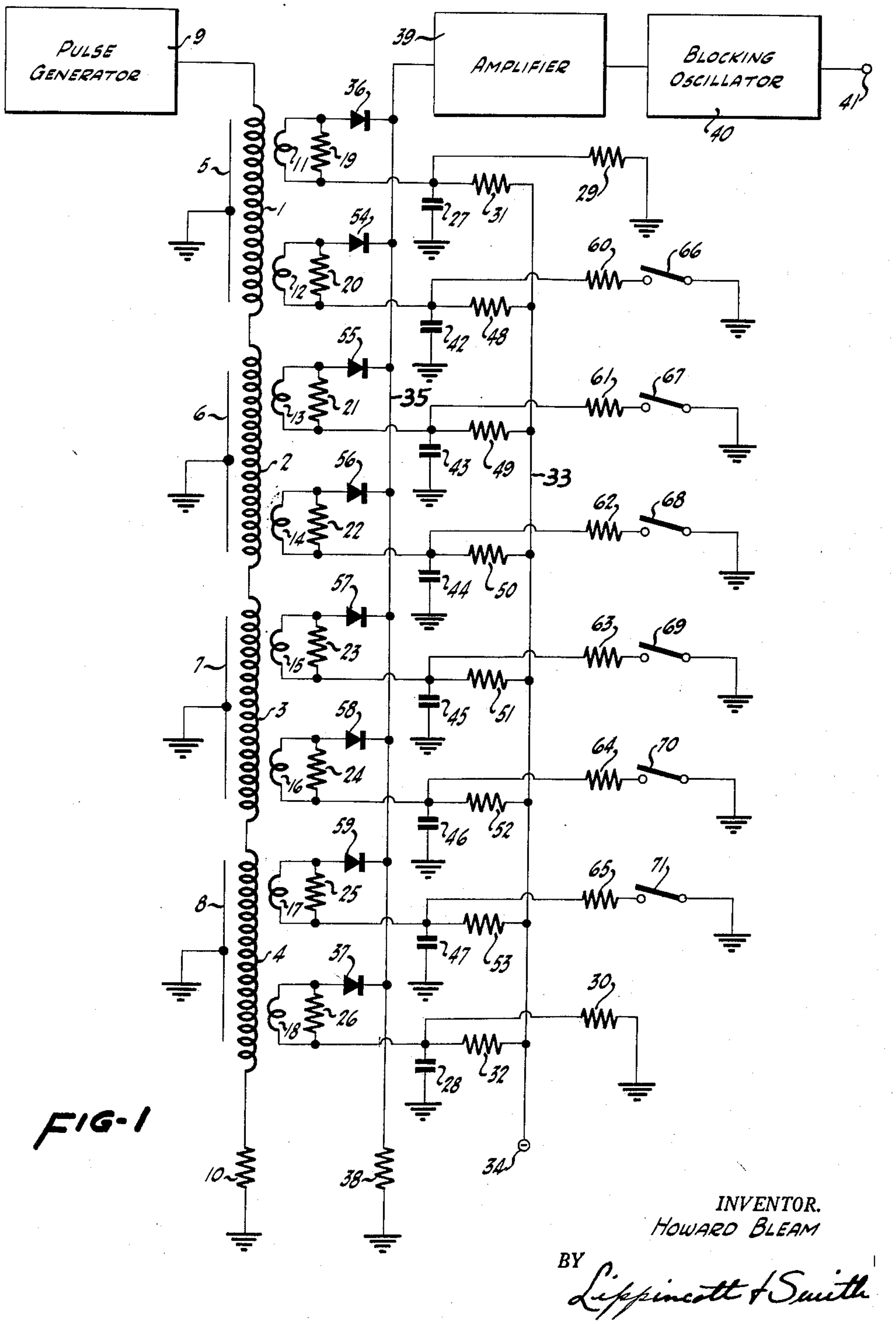

The apparatus illustrated in FIG. 1 is an encoding device used to produce repetitive coded sequences of output electric pulses for an air traffic control beacon system. Each sequence consists of a maximum of eight identical electric pulses accurately spaced in time at intervals of 2.9 microseconds. The first and last pulses of each sequence are always present, but any combination of the remaining six pulses in each sequence may be provided for the transmission of coded information.

Prior to the present invention, encoding devices for this purpose have employed lumped-constant delay lines comprising approximately 200 separate inductors, approximately 200 separate capacitors, and 8 taps connected to switches or relays for selecting delay times up to about 20 microseconds with an accuracy of 0.1 microsecond, at best. Even this costly, bulky and complex delay structure heretofore used did not establish the time positions of the output pulses with sufficient accuracy to meet the requirements of the air traffic control beacon system. To achieve adequate accuracy, it was necessary to employ an additional accurately controlled pulse generator for producing clock or timing pulses that were fed through a gate circuit operated by signals obtained from the delay line taps in order to obtain output pulses in a sufficiently precise and accurate timed sequence. Consequently, the prior encoding devices were of considerable complexity, costliness and bulk.

The present encoding device consists essentially of a distributed-constant delay line with a plurality of movable pick-up coils adjustably spaced along its length and inductively coupled thereto, a pulse generator for supplying repetitive input pulses to the delay line so that each input pulse induces an electric signal in each of the pick-up coils in sequence, the time relation of such signals depending upon the delay characteristics of the delay line and the respective positions of the movable pick-up coils along the length of the delay line, and pulse-forming means, such as a blocking oscillator, triggered by a plurality of these electric signals to provide a plurality of output pulses in precisely and accurately timed sequence for each of the input pulses. The time relations of the output pulses in each sequence can be precisely and accurately adjusted by adjusting the positions of the pick-up coils.

Referring now to FIG. 1 of the drawings, the delay line can conveniently be constructed of a plurality (four, for example) of delay line units or sections 1, 2, 3 and 4 connected together in series, as shown. Each delay line section consists essentially of an elongated inductive winding, having distributed series inductance and capacitance, in proximity to one or more ground strips providing substantially distributed shunt capacitance. In FIG. 1, the ground strips are represented by vertical lines 5, 6, 7 and 8, connected to ground or its circuit equivalent.

A pulse generator 9 supplies repetitive input electric pulses, one for each desired coded sequence of output pulses. Pulse generator 9 is connected to the input terminal of delay line section 1, and the input pulses are transmitted through delay line sections 1, 2, 3 and 4 in sequence with a total delay time slightly greater than 20 microseconds (about 22 microseconds, for example), between the input terminal of section 1 and the output terminal of section 4. A resistor 10, preferably having a resistance substantially equal to the image impedance of the delay line, is connected to the output terminal of delay line section 4 to minimize undesirable reflections of the electric pulses transmitted by the delay line.

A plurality (eight, for example) of movable pick-up coils, identified in FIG. 1 by reference numerals 11 through 18 inclusive, are adjustably spaced along the length of the delay line and are inductively coupled thereto so that each electric pulse transmitted by the delay line induces an electric signal in each of the pick-up coils in sequence. Consequently, for each electric pulse supplied by pulse generator 9, the eight pick-up coils provide eight electric signals in timed sequence having time relations relative to one another that depend upon the delay characteristics of the delay line and the respective positions of the pick-up coils along the length of the delay line. Two pick-up coils may conveniently be associated with each of the four delay line sections 1 through 4, and each pick-up coil is independently movable to some extent along the length of its delay line section for adjusting the time relations of the eight electric signals in each sequence. Eight loading resistors, identified in FIG. 1 by reference numerals 19 through 26 inclusive, are connected across respective ones of the eight pick-up coils, as shown.

Pick-up coils 11 and 18 have terminals connected to ground, or its circuit equivalent, through capacitors 27 and 28 in parallel with resistors 29 and 30. The same terminals are connected through resistors 31 and 32 to a lead 33 that is maintained at a negative bias potential by a negative potential supplied to a terminal 34 by any suitable voltage supply means (not shown). Other terminals of pick-up coils 11 and 18 are connected to a lead 35 through diode rectifiers 36 and 37 poled for the conduction of current from the pick-up coils to lead 35 when positive voltages are induced in the pick-up coils.

Resistors 29 and 31 form a voltage divider, and resistors 30 and 32 form another voltage divider, for applying a small reverse voltage across rectifiers 36 and 37, so that only the more positive portions (alternatively, negative portions may be used by reversing the polarities of the rectifiers and bias voltages) of electric signals induced in pick-up coils 11 and 18 are transmitted to lead 35. Lead 35 is connected to ground, or its circuit equivalent, through a resistor 38, and lead 35 is also connected to the input of an amplifier 39, which amplifies electric signals transmitted to lead 35 from the pick-up coils. The amplified signals trigger a blocking oscillator 40 that supplies electric pulses of substantially rectangular waveform to an output terminal 41 of the encoding device.

Pick-up coils 12 through 17 are connected to ground, or its circuit equivalent, through a plurality of capacitors identified by reference numerals 42 through 47, inclusive. The same terminals are connected to lead 33 through resistors identified by reference numerals 48 through 53 inclusive. Other terminals of pick-up coils 12 through 17 are connected to lead 35 through diode rectifiers, identified by reference numerals 54 through 59 inclusive, poled to conduct current from the pick-up coils to lead 35 when sufficiently positive voltages are induced in the pick-up coils.

Connected in parallel with capacitors 42 through 47 there are a plurality of resistors, identified by reference numerals 60 through 65 inclusive, in series with a plurality of switches identified by reference numerals 66 through 71 inclusive. When switches 66 through 71 are closed, there are applied across rectifiers 50 through 59 reverse voltages that are substantially equal to the reverse voltages applied across rectifiers 36 and 37, so that the more positive portions of electric signals induced in pick-up coils 12 through 17 are transmitted to lead 35 and amplifier 39 for triggering blocking oscillator 40. When switches 66 through 71 are open, the entire negative bias potential supplied at terminal 34 applies across rectifiers 54 through 59 a larger reverse voltage that is sufficiently large to block the rectifiers 54 through 59 at all times and to prevent the transmission of any portion of the induced signals from pick-up coils 12 through 17 to lead 35.

Consequently, switches 66 through 71 provide means for selectively and individually changing the magnitudes of the reverse voltages applied across rectifiers 54 through 59, to control whether or not signals induced in pick-up coils 12 through 17 trigger blocking oscillator 40 to produce output pulses at terminal 41. Since switches 66 through 71 affect the bias voltages only, and are not required to transmit high-frequency signal components, the switches may, if desired, be located remotely from the remainder of the circuit.

The general operating principles of the encoding device illustrated in FIG. 1 can be explained briefly as follows: Pulse generator 9 supplies repetitive input electric pulses to the delay line at a relatively low repetition rate, the interval between successive input pulses being greater than the total delay time of the four-section delay line. As each input pulse travels down the delay line, it induces an electric signal in each of the pick-up coils 11 through 18 in sequence. That is, the input pulse first induces an electric signal in pick-up coil 11, then, 2.9 microseconds later, it induces an electric signal in pick-up coil 12, then, another 2.9 microseconds later, it induces an electric signal in pick-up coil 13, etc., so that the eight pick-up coils provide eight electric signals in precisely and accurately timed sequence for each input pulse.

When all six of the switches 66 through 71 are closed, positive portions of all eight signals induced in the eight pick-up coils are transmitted to lead 35 and amplifier 39, and the amplified signals successively trigger blocking oscillator 40 to provide at output terminal 41 eight substantially identical output electric pulses in timed sequence at intervals of 2.9 microseconds. When any of the switches 66 through 71 are open, corresponding ones of the triggering signals are not transmitted to lead 35 and amplifier 39, and certain pulses are missing from the output pulse sequence. Thus each input pulse produces an accurately timed sequence of output pulses consisting of a maximum of eight pulses precisely and accurately spaced at 2.9 microseconds intervals. The first and last pulses of each sequence are always present, but any combination of the other six pulses in a sequence may be produced to provide a pulse code representing information that is to be transmitted by the system.

The impedance of the eight pick-up circuits is made sufficiently high that the amount of energy extracted from the delay line by each pick-up coil is small, and such energy absorption does not produce undesirably large reflections of pulses transmitted by the delay line. Any reflections that are produced, either at the pick-up coils or at the terminating impedance 10 or elsewhere in the delay line, result in pulses having such small amplitudes that they do not induce in the pick-up coils signals of sufficient amplitude to overcome the minimum bias voltage applied across the diode rectifiers.

Furthermore, the resistance of resistor 38, which may be the input impedance of amplifier 39 is sufficiently large compared to the resistances of the loading resistors connected across the pick-up coils that there is little difference in the amount of energy absorbed from the delay line by pick-up coils 12 through 17 when switches 66 through 71 are open and when switches 66 through 71 are closed. This is desirable so that such energy absorption will not affect the delay characteristics of the delay line and will not materially alter the time positions of subsequent output pulses when some of the switches are opened and closed, selectively.

Figure 2:
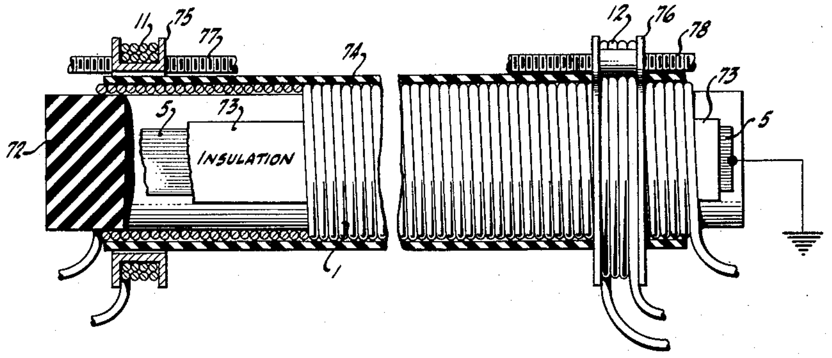
FIG. 2 is a somewhat schematic side elevation, partly in section, of a delay line and pick-up coil unit that may be used in the FIG. 1 apparatus.

The construction of delay line sections 1 through 4 can be better understood by reference to FIG. 2, which illustrates one possible construction of a delay line section. An elongated cylindrical core 72 preferably is made of a low-loss electrically insulating material. The ground strip 5 may be one or more strips of metal foil extending lengthwise alongside core 72, as shown. Strip 5 may be covered by a thin sheet of insulation 73 to insulate the ground strip more effectively from the delay line winding, but in some cases insulation 73 may be omitted and the insulation between the wire and the ground strip may be provided solely by insulation covering the wire of the winding.

The delay line inductive winding 1 may be a simple helical winding of insulated wire wound about core 72 and ground strip 5, as shown. Alternatively, a multilayer winding may be employed, which preferably is of the type described and claimed in the copending patent application of Daniel A. Gillen, entitled "Electrical Delay Line", Serial No. 590,465, filed June 11, 1956, and assigned to the same assignee as the present application. A protective layer of insulation 74, and if desired additional ground strips or compensation patches, or both, may be provided around the outside of inductive winding 1, as shown.

Pick-up coils 11 and 12 preferably are annular multiturn windings disposed around and coaxial with the delay line, as shown, so that each of the pick-up coils is in inductively coupled relation to the delay line. Pick-up coils 11 and 12 may be wound upon two insulating spools 75 and 76 that are independently movable in the lengthwise direction of the delay line for adjusting the spacing of the pick-up coils to adjust the time interval between the electric signals induced therein. The positions of spools 75 and 76 are adjusted by means of lead screws 77 and 78 that pass through threaded collars attached to the spools.

Figure 3:
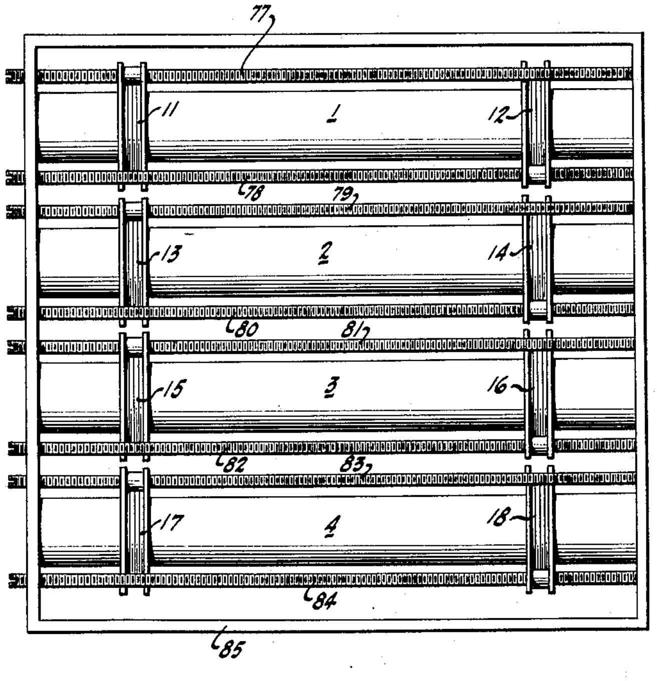
FIG. 3 is a plan view showing a compact structure wherein four of the delay line units or sections shown in FIG. 2 are arranged side-by-side to form a compact four-section delay line having eight movable pick-up coils spaced along its length.

Referring now to FIG. 3 of the drawings, an exceptionally compact and economical structure may be obtained by disposing the four delay line sections 1, 2, 3 and 4 side-by-side, as shown. Two of the eight pick-up coils 11 through 18 are associated with each of the four sections of the delay line, and eight lead screws, identified by reference numerals 77 through 84, are provided for individually adjusting the positions of the eight pick-up coils along the delay line for accurately and precisely adjusting the time positions of the output pulses. The entire delay line and pick-up coil structure may be mounted on a single chassis 85, which may be a shallow rectangular metal box or pan.

Figure 4:
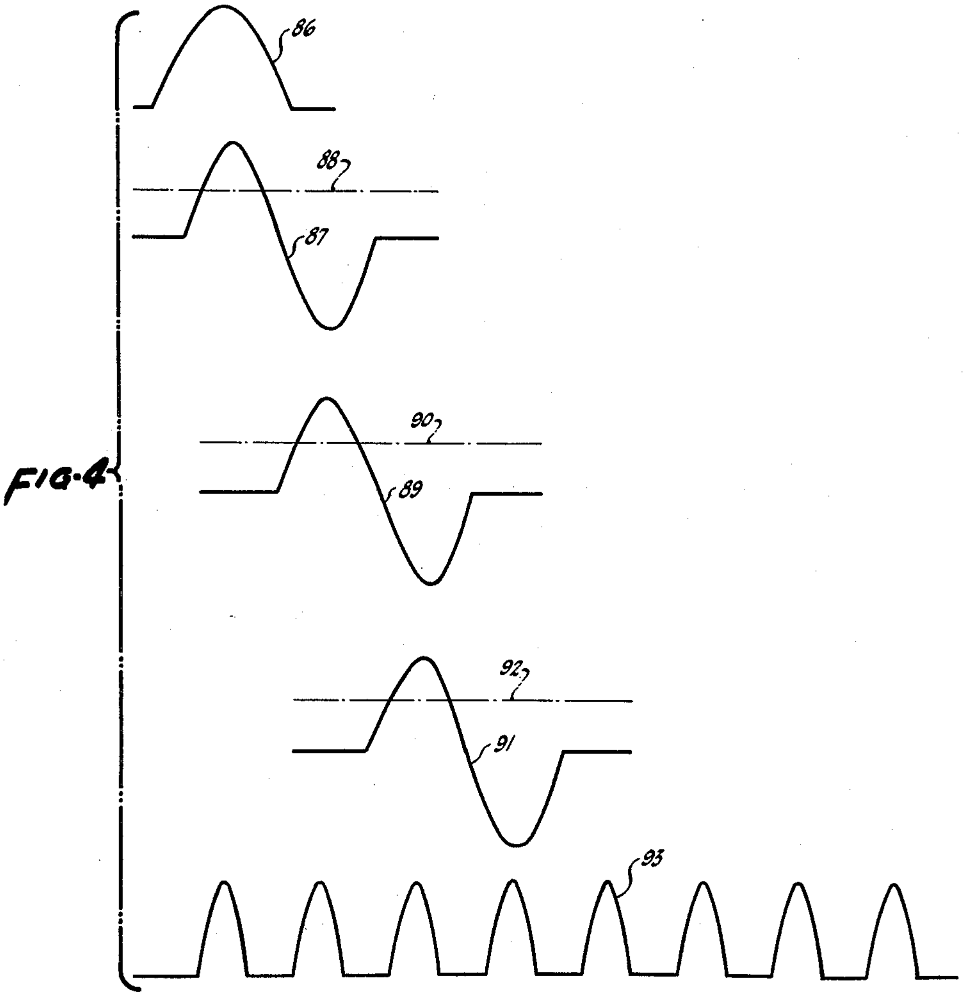
FIG. 4 is a group of curves that will be used in explaining the invention.

A better understanding of the operation of the improved encoding device may be had by reference to the curves shown in FIG. 4. Curve 86 represents an input electric pulse supplied to the delay line by pulse generator 9. Preferably each input pulse has a waveform that is substantially one-half cycle of a sine wave, as shown, to minimize waveform changes as the pulse travels down the delay line, and in particular to reduce changes in the rise time of the transmitted pulse as it travels between the input and output ends of the delay line due to restricted bandpass delay line characteristics.

As each input pulse transmitted by the delay line passes pick-up coil 11, there is induced in pick-up coil 11 an electric signal having a waveform, represented by curve 87, that is substantially one cycle of a sine wave. The more positive portions of this signal are transmitted through rectifier 36 to line 35, and are amplified by amplifier 39. Consequently, the portion of curve 87 above broken line 88 forms a triggering pulse that triggers blocking oscillator 40 to produce an electric pulse at output terminal 41.

Exactly 2.9 microseconds later, the input pulse induces in pick-up coil 12 an electric signal having the waveform represented by curve 89. If switch 66 is closed, the portion of signal 89 above broken line 90 forms a triggering pulse that triggers blocking oscillator 40 to produce another output pulse at terminal 41. If switch 66 is open, the reverse voltage provided across rectifier 54 by the negative bias potential supplied through lead 33 is of such magnitude that no portion of the signal represented by curve 89 is transmitted to lead 35.

Similarly, another 2.9 microseconds later, the input pulse induces in pick-up coil 13 an electric signal having the waveform represented by curve 91. If switch 67 is closed, the portion of curve 91 above broken line 92 forms another triggering pulse that triggers blocking oscillator 40 to produce another output pulse at terminal 41. In the same manner, similar signals are induced in pick-up coils 14, 15, 16, 17 and 18 as the input pulse travels down the delay line.

If all six of the switches 66 through 71 are closed, a sequence of eight identical pulses, precisely and accurately spaced in time at intervals of 2.9 microseconds, are provided at output terminal 41. Such a sequence of eight pulses is represented in FIG. 4 by curve 93. Whenever selected ones of the switches 66 through 71 are open, corresponding pulses are eliminated from the output pulse sequence to provide a coded sequence of pulses representing information that is to be transmitted. Each time that pulse generator 9 supplies another input pulse to the delay line, another sequence of output pulses is provided at terminal 41.

The time positions of the output pulses relative to one another can be adjusted with great precision by adjusting the relative positions along the delay line of the eight pick-up coils. However, it is considerably more difficult to insure that these time relations will remain precisely constant in actual practice under adverse operating conditions encountered in practical air traffic control beacon installations, such as temperature variations, supply voltage variations, and the like. For example, temperature variations may produce changes in the delay characteristics of the delay line. Consequently, it is necessary either to control very accurately the temperature of the delay line, or to give a great deal of attention to thermal stability in the design of the delay line, or both. Preferably, the thermal stability problem is solved in the manner described in the copending patent application of Robert M. Jones entitled "Temperature-Compensated Electric Pulse Encoding Device," Serial No. 590,466, filed June 11, 1956, and assigned to the same assignee as the present application.

Another problem solved by the present invention arises from the fact that any practical delay line inherently produces electrical losses in signals that it transmits, due to resistance of the wire, dielectric losses, and the like. Because of these losses, the input pulses decrease in amplitude and increase in width as they travel down the delay line. Both of these changes decrease the rise time of the input pulses, and in consequence tend to decrease the amplitude and rise time of the electric signals induced in successive ones of the pick-up coils.

In other words, if the eight pick-up circuits were identical, the eight electric signals induced in the eight pick-up coils would have progressively decreasing amplitudes and rise times; and blocking oscillator 40 would be triggered at a different point on the waveform of each successive induced signal. Furthermore, under actual operating conditions involving temperature and supply voltage variations, the amplitude of the input pulses supplied to the delay line by pulse generator 9 will inevitably vary, and the amplitudes of the signals induced in the pick-up coils likewise vary. This shifts the points on the induced signal waveforms at which blocking oscillator 40 is triggered, and if the amplitudes or the rise times of the eight signals induced in the eight pick-up coils differ, changes will occur in the relative time positions of the output pulses supplied by the blocking oscillator.

Figure 5:
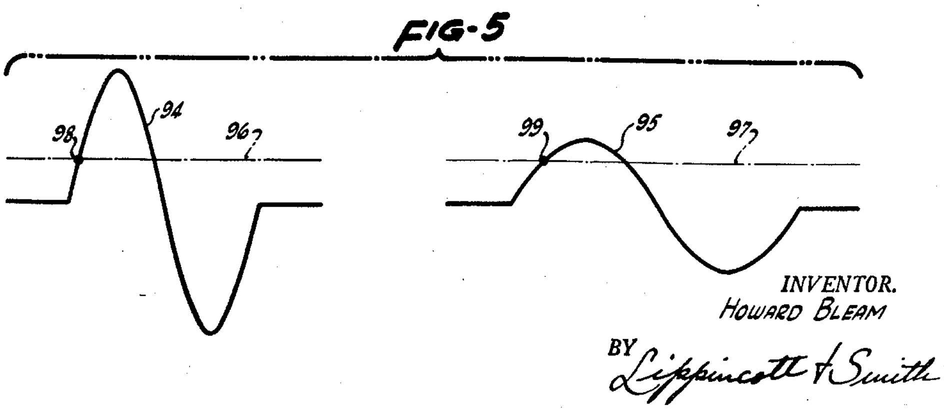
FIG. 5 is another group of curves that will be used in explaining the invention.

For a better understanding of this problem, reference is now made to the curves shown in FIG. 5. Assume that curve 94 represents the waveform of electric signals induced in pick-up coil 11, and that curve 95 represents the waveform of electric signals induced in pick-up coil 18. Broken lines 96 and 97 represent the signal levels at which triggering of blocking oscillator 40 occurs. In other words, blocking oscillator 40 is triggered at point 98 of curve 94 to produce the first output pulse of a sequence, and blocking oscillator 40 is again triggered at point 99 of curve 95 to produce the last output pulse of a sequence. By adjusting the relative positions of pick-up coils 11 and 18, the time interval between points 98 and 99 can be adjusted precisely to the desired value.

But assume now that after such an adjustment is made the amplitude or the rise time of the input pulses changes. Such changes will produce changes in the amplitudes of curves 94 and 95, and will shift points 98 and 99 along the waveforms of the signals, induced in the pick-up coils. Because curve 94 is much steeper at point 98 than curve 95 is at point 99, such a shift changes the time interval between points 98 and 99 and thus changes the time relation of the output pulses.

The difficulty can be overcome if all eight of the electric signals induced in the eight pick-up coils by the same input pulse can be made to have equal amplitudes and rise times. For example, assume that the eight pick-up circuits are so designed that all eight of the induced signals have substantially identical waveforms, which may be represented by curve 94, for example. Under such conditions the blocking oscillator 40 will be triggered at the same point on the waveform of each of the eight signals induced in the eight pick-up coils, and any change in the amplitude or the rise time, or both, all of the induced signals changing in the same way and by the same amount, produces identical effects upon the timing of all output pulses, and the time relations of the output pulses with respect to one another, and the time intervals between pulses remain precisely constant. Therefore, the problem can be solved if the amplitudes and rise times of the eight signals induced in the eight pick-up coils can be made substantially identical.

This can be done in the following manner:

The amplitude of the signal induced in a pick-up coil can be increased by increasing the number of turns in the pick-up coil. Since the amplitude and the rise time of the input pulse both decrease as the pulse travels down the delay line, the amplitudes of the respective signals induced in successive ones of the eight pick-up coils tend to decrease progressively. This progressive decrease in signal amplitude can be counteracted by progressively increasing along the length of the delay line the number of turns in each pick-up coil—for example, by making each successive pick-up coil with a larger number of turns than the preceding pick-up coil—so that all eight of the induced signals have substantially equal amplitudes.

Although this greatly increases the stability of the time relationship of the output pulses, it does not completely solve the problem for the following reasons: As the input pulses travel down the delay line, not only do they decrease in amplitude, but also they increase in width. Consequently, if the amplitudes of the induced signals are made equal simply by progressively increasing the number of turns in each succeeding pick-up coil, the widths of the induced signals will nevertheless increase progressively, in the manner illustrated by curves 94 and 95 of FIG. 5. Therefore, succeeding ones of the induced signals will have progressively increasing rise times and the waveform slopes at the triggering points will not be the same.

Both the amplitude and the width of the signal induced in a pick-up coil are influenced by changes in the resistance of the loading resistor connected across the coil. The smaller the resistance of the loading resistor is, the smaller the amplitude and the greater the width of the induced signal will be. Now assume, for example, that all eight pick-up coils have the same number of turns, and that the resistance of each succeeding loading resistor to greater than that of the preceding loading resistor by an amount such that all of the eight induced signals have equal amplitudes. Under these conditions, it will be found that overcompensation has been obtained for the progressive changes in rise time, so that the rise times of the induced signals progressively decrease from one to the next succeeding one of the pick-up coils. Here again, the stability of the time relationship of the output pulses is improved over what it was without any compensation, but the problem has not been completely solved.

For a complete solution to the problem, the number of turns in each pick-up coil should increase progressively along the length of the delay line; and the resistance of each loading resistor should also increase progressively along the length of the delay line.

By proper choice of the relative turns numbers of the eight pick-up coils and the relative resistances of the eight loading resistors, the eight signals induced in the eight pick-up coils can be made to have substantially identical amplitudes and rise times. When this has been accomplished, exceptional stability of the time relationships of the output pulses in each sequence with respect to each other is obtained.

The optimum number of turns to be used in each pick up coil, and the optimum resistance of each loading resistor, depends upon the characteristics of the delay line used and other design parameters of the circuit. Consequently, the exact relation of turns numbers and resistance values to give the best results with a particular delay line and in a particular circuit is best determined by trial and error. Turns may be added or subtracted from each pick-up coil, and changes may be made in the value of each loading resistor, by a series of successive adjustments, until it is found by experimental measurements that the eight induced signals have substantially identical amplitudes and rise times.

It should be understood that this invention in its broader aspects is not limited to the specific embodiment herein illustrated and described, and that the following claims are intended to cover all changes and modifications that do not depart from the true spirit and scope of the invention.

What is claimed is:

1. An electric pulse encoding device comprising means for supplying repetitive input electric pulses, an electrical delay line for transmitting said input pulses, a plurality of pick-up coils spaced along the length of said delay line and inductively coupled thereto so that each input pulse as it travels along the delay line induces an electric signal in each of said pick-up coils in sequence, each of said pick-up coils having first and second terminals, means for supplying bias potentials to each of said first terminals of said coils, a plurality of rectifiers connected in series with respective ones of said second terminals of said coils, said bias potentials applying reverse voltages across said rectifiers to bias each rectifier to be normally nonconductive, a plurality of switches operable to change the bias potential supplied to respective ones of said coils so that each of said rectifiers may be biased to transmit or not to transmit, selectively, peak portions of the signals induced in respective ones of said coils, and pulse-forming means connected to said second terminals of said coils through said rectifiers and adapted to be triggered by each signal transmitted by said rectifiers to provide a coded sequence of output electric pulses for each of said input pulses.

2. An electric pulse encoding device comprising a pulse generator for supplying repetitive input electric pulses, an electrical delay line connected to said pulse generator for transmitting said input pulses, a plurality of movable pick-up coils adjustably spaced along the length of said delay line and inductively coupled thereto so that each input pulse as it travels along the delay line induces an electric signal in each of said pick-up coils in sequence, each of said pick-up coils having first and second terminals, a plurality of capacitors connected between respective ones of said first terminals and ground, a blocking oscillator for supplying output electric pulses, a triggering circuit for transmitting signals to trigger said blocking oscillator, a plurality of rectifiers connected between respective ones of said second terminals and said triggering circuit, a source of bias potential, a plurality of resistors connected between respective ones of said first terminals and said source of bias potential, said bias potential applying a reverse voltage across each of said rectifiers to bias each rectifier to be normally nonconductive, a plurality of resistors and switches connected in series between respective one of said first terminals and ground, said switches being independently operable to open and closed positions for selectively changing the bias potentials supplied to respective ones of said first terminals, thereby selectively changing the magnitudes of the reverse voltages applied across respective ones of said rectifiers, the magnitudes of said reverse voltages being such that each rectifier conducts peak portions of signals induced in the pick-up coil to which it is connected when the corresponding one of said switches is closed and does not conduct any portion of such induced signals when the corresponding switch is open, said blocking oscillator being triggered by each signal transmitted by said rectifiers to provide a coded sequence of substantially identical output electric pulses for each input pulse.

3. Apparatus for producing electric pulses in timed sequence, comprising a pulse generator for producing a first plurality of repetitive electric pulses, each pulse of said first plurality having a waveform substantially similar to one-half cycle of a sine wave, an electrical delay line connected to said pulse generator for transmitting said first plurality of pulses, each pulse of said first plurality decreasing in amplitude and increasing in width as it travels along said line, a plurality of multi-turn coils spaced along the length of said delay line and inductively coupled thereto, whereby each pulse of said first plurality induces in each of said coils an electric signal having a waveform substantially similar to one cycle of a sine wave, said signals occurring in timed sequence at times depending upon the delay characteristics of said delay line and the respective positions of said coils, each succeeding one of said coils having more turns than the preceding one, a plurality of loading resistors connected across respective ones of said coils, each succeeding one of said resistors having a higher resistance than the preceding one, the respective turns numbers of said coils and the respective resistances of said resistors being so related that said signals have substantially equal amplitudes and rise times, and pulse-forming means connected to a plurality of said coils and triggered by said signals to provide a second plurality of substantially identical electric pulses in timed sequence for each pulse of said first plurality.

4. An electric pulse encoding device comprising means for supplying repetitive input electric pulses, an electrical delay line for transmitting said input pulses, a plurality of pick-up coils spaced along the length of said delay line and inductively coupled thereto so that each input pulse as it travels along the delay line induces an electric signal in each of said pick-up coils in sequence, each of said pick-up coils having first and second terminals, means to supply bias voltage to the first terminal of each of said coils, a pulse generating means, a plurality of rectifiers having one terminal connected respectively to the second terminal of each of said pick-up coils and normally biased to a non-conducting state by said applied bias voltage, a connection from the second terminal of the rectifiers to the pulse generating means, means for changing the biasing voltage to place the rectifier in a conducting state for transmitting induced signal voltages to trigger said pulse generating means, and means to selectively control the magnitude of the bias voltage applied to the second terminal of each of said pick-up coils to change those rectifier elements between the first and the last of the plurality of pick-up coils between signal-passing and signal-interrupting states thereby to control the generation of said pulses by the pulse generating means in time periods between the arrival time of a pulse supplied to the delay line at the first and last pick-up coils to provide a coded output sequence of pulses from the pulse generating means.

5. An electric pulse encoding device comprising means for supplying repetitive input electric pulses, an electrical delay line for transmitting said input pulses, a plurality of pick-up coils each having first and second terminals and being spaced along the length of said delay line and inductively coupled thereto so that each input pulse as it travels along the delay line induces an electric signal in each of said pick-up coils in sequence, means to supply bias voltage to the first terminal of each of said coils, a pulse generating means adapted to controllably generate pulses to be supplied to an output, a plurality of rectifier means connected with respective ones of the second terminal of each of said pick-up coils, a connection from each rectifier to the pulse generating means for transmitting induced signal voltages to trigger said pulse generating means, and means to selectively control the magnitude of the bias voltage applied to the second terminal of each of said pick-up coils to change those rectifier elements between the first and the last of the plurality of pick-up coils between signal-passing and signal-interrupting states thereby to control the development of said pulses by the pulse generating means in time periods between an initial and a terminating pulse to provide a coded output sequence of pulses from the pulse generating means.

6. An electric pulse encoding device comprising means for supplying repetitive input electric pulses, an electrical delay line for transmitting said input pulses, a plurality of pick-up coils spaced along the length of said delay line and inductively coupled thereto so that each input pulse as it travels along the delay line induces an electric signal in each of said pick-up coils in sequence and in time delay, each of said pick-up coils having first and second terminals, means to supply bias voltage to the first terminal of each of said coils, a pulse generating means, rectifier means connected in series between the second terminal of each of said pick-up coils and the pulse generating means for transmitting induced signal voltages to trigger said pulse generating means, and a switching means connected to the first terminal of each pick-up coil between the first and last of the group to selectively control the magnitude of the applied bias voltage effectively to switch rectifier elements between the first and the last of the plurality of pick-up coils between current-passing and current-interrupting states thereby to control selectively the generation of pulses in said pulse generating means to provide a coded output sequence of pulses from the device.

References Cited in the file of this patent

UNITED STATES PATENTS

| | | |
|---|---|---|
| 1,456,909 | Pupin | May 29, 1923 |
| 2,128,257 | Lee et al. | Aug. 30, 1938 |
| 2,540,560 | Wheeler | Feb. 6, 1951 |
| 2,659,866 | Landon | Nov. 17, 1953 |
| 2,832,951 | Browne | Apr. 29, 1958 |